United States Patent
Cho et al.

(10) Patent No.: US 7,978,428 B2
(45) Date of Patent: Jul. 12, 2011

(54) METHOD OF READING DATA STORED IN A DATA STORAGE DEVICE AND DATA STORAGE DEVICE THAT PERFORMS A DATA READ RETRY OPERATION

(75) Inventors: Jae Deog Cho, Suwon-si (KR); Seung Youl Jeong, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 239 days.

(21) Appl. No.: 12/358,355

(22) Filed: Jan. 23, 2009

(65) Prior Publication Data
US 2009/0190246 A1 Jul. 30, 2009

(30) Foreign Application Priority Data
Jan. 25, 2008 (KR) .................. 10-2008-0007754

(51) Int. Cl.
G11B 5/27 (2006.01)
(52) U.S. Cl. ........................................ 360/58
(58) Field of Classification Search .............. 360/58, 360/31, 50, 51, 48, 77.01, 77.04, 77.06, 78.14, 360/39; 711/113; 369/53.36, 59.25
See application file for complete search history.

(56) References Cited

U.S. PATENT DOCUMENTS

| | | | |
|---|---|---|---|
| 4,967,292 A | | 10/1990 | Moteki |
| 5,077,720 A | * | 12/1991 | Takagi et al. ............ 369/59.25 |
| 5,631,783 A | * | 5/1997 | Park .............................. 360/51 |
| 5,748,401 A | * | 5/1998 | Kawai ........................ 360/78.14 |
| 5,784,216 A | * | 7/1998 | Zaharris ......................... 360/48 |
| 6,646,969 B2 | * | 11/2003 | Takahashi ................ 369/53.36 |
| 7,099,993 B2 | * | 8/2006 | Keeler ......................... 711/113 |
| 7,602,576 B2 | * | 10/2009 | Yoshida .................... 360/77.01 |
| 2005/0066121 A1 | * | 3/2005 | Keeler ......................... 711/113 |

* cited by examiner

*Primary Examiner* — Fred Tzeng
(74) *Attorney, Agent, or Firm* — Volentive & Whitt, PLLC

(57) ABSTRACT

A disk drive includes a disk having a track that includes a data sector divided by a servo sector so that a first data sector portion is on a first side of the servo sector, and a second data sector portion is on a second side of the servo sector. The disk drive reads data by: positioning the head at a first offset position with respect to the track and reading data from the data sector. When a read error occurs between the first and second data sector portions, the disk drive: stores the data from the first data sector portion in memory, moves the head to a second offset position with respect to the track, reads data from the second data sector portion with the head at the second offset position, and stores the data read from the second data sector portion in the memory.

10 Claims, 8 Drawing Sheets

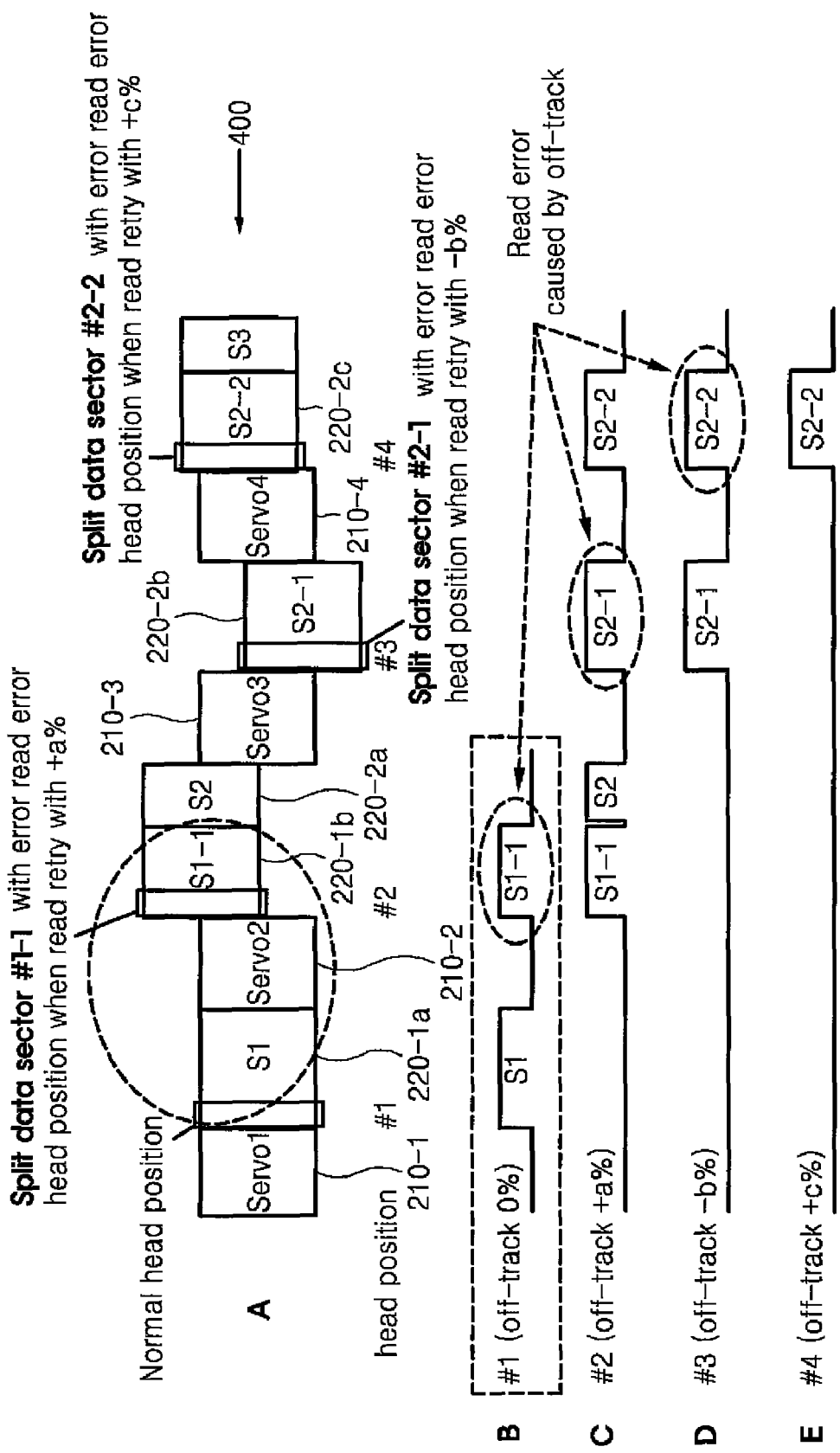

US 7,978,428 B2

METHOD OF READING DATA STORED IN A DATA STORAGE DEVICE AND DATA STORAGE DEVICE THAT PERFORMS A DATA READ RETRY OPERATION

PRIORITY STATEMENT

This application claims priority under 35 U.S.C. §119 from Korean Patent Application 2008-0007754, filed on 25 Jan. 2008 in the names of JaeDeog Cho et al., the entirety of which is hereby incorporated by reference for all purposes as if fully set forth herein.

BACKGROUND OF THE INVENTION

1. Field

This invention pertains to the data storage systems, such as disk drive units, and more particularly to a method of retrying a data read operation in a data storage device when a data read error occurs, and a data storage device that performs such a method.

2. Description

There continues to be a demand to process and store an ever-increasing amount and variety of digitized information. This demand is fueled in part by the desire to store and process digitized information from sources which generate a large volume of data, such as audio and video programming material. The demand for processing these kinds of information sources in turn places new demands on the devices which are employed to process and store this data, including disk drive units.

In particular, the increasingly common practice of storing large amounts of digital audio and video data on data storage devices places new demands on these storage devices. For example, users now routinely store large digital audio and video data files onto disk drive units (including, specifically "hard disk drive" (HDD) units) whose standards were originally developed in an era before audio and video programs were routinely digitized and stored on these kinds of data storage devices.

FIG. 1 illustrates the structure of a track 100 of a data storage device, and specifically a disk drive unit. The track 100 includes servo sectors 110 and data sectors 120. In traditional disk drive units, each data sector 120 is able to store 512 bytes. Without elaborating, there are a few operating system disk setup utilities that permit this 512 byte number per sector to be modified, however 512 is the standard, and is found on virtually all disk drive units by default. Each data sector, however, actually holds much more than 512 bytes of information. Additional bytes are needed for control structures, information necessary to manage the drive, locate data, and perform other functions. The exact sector structure depends on the drive manufacturer and model; however the contents of a sector typically include the following elements: ID Information; Synchronization Fields; Payload Data; Error Correction Coding (ECC); and gaps. All of these elements—other than the payload data itself—can be considered to be overhead.

The aforementioned demand for storing larger volumes of data on these disk drive units suggests the need to increase the storage efficiency of the disk drive unit. One method of accomplishing this is to use larger data sectors so that the percentage of each data sector required for overhead is reduced. Also, as larger data files are being stored on these disk drive units, it is desirable to reduce the number of data sectors required for storing these files—which also suggests using larger data sectors.

Accordingly, these data storage demands are leading to the development of disk drive units which use a so-called "multi-sector" or "large-sector" format wherein each data sector is enlarged to the size of two or more "traditional" data sectors. In these disk drive units, each sector may store 1 kilobyte, 2 kilobytes, or even 4 kilobytes of data. For example, FIG. 1 shows one of these "new" data sectors 130 which comprises four traditional data sectors and stores 2 kilobytes of data.

Data sectors with the "multi-sector" or "large-sector" format have less overhead (and are therefore more efficient) than the traditional 512 byte data sector format, and are also better for storing large audio and video data files of several megabytes or more.

However, there are some issues raised with these larger data sectors.

FIG. 2 illustrates an exemplary data read operation for a data storage device, and specifically a disk drive unit employing a "multi-sector" or "large-sector" format. As shown in FIG. 2, a first data sector 220-1 is divided by a servo sector Servo2 210-2 so as to have a first data sector portion S1 220-1a on a first side of servo sector Servo2 210-2, and a second data sector portion S1-1 220-1b on a second side of servo sector Servo2 210-2.

During the read operation illustrated in FIG. 2 on line "A", a read head (or read/write head) 24 follows the track 100 at a "normal head position" having a 0% lateral offset with respect to the longitudinal direction of the track 100. Head 24 uses the servo information from the servo sectors 210 to follow the track 100.

As illustrated in FIG. 2 on line "B", with head 24 at the 0% offset, data is read correctly from data sector 220-1. However, when head 24 tries to read the data of the second data sector 220-2, there is a data read error. More specifically, when the head 24 tries to read the data from data sector 220-2 with head 24 at the 0% offset, it can correctly read the data from the first data sector portion S2 220-2a on the first side of servo sector Servo3 210-3, but it cannot correctly read the data from the second data sector portion S2-1 220-2b on the second side of servo sector Servo2 210-3. Furthermore, head 24 also cannot correctly read the data from the third data sector portion S2-2 220-2c on the second side of servo sector Servo4 210-4.

Accordingly, the lateral position of head 24 is adjusted to have a "−A %" offset position and the head 24 retries reading the data sector.

With head 24 adjusted to have the −A %" offset position, as illustrated in FIG. 2 on line "C", head 24 is able to correctly read the data from the second data sector portion S2-1 220-2b on the second side of servo sector Servo2 210-2. However, head 24 can no longer correctly read the data from the first data sector portion S2 220-2a on the first side of servo sector Servo3 210-3. Also, it still cannot correctly read the data from the third data sector portion S2-2 220-2c on the second side of servo sector Servo4 210-4.

So it is seen that when a "multi-sector" or "large-sector" data sector which is divided by a servo sector has different "off-track" amounts or percentages for the data sector portions on different sides of the servo sector, the disk drive unit cannot always solve a data read error by the method of data reading illustrated in FIG. 2. Furthermore, the problem is especially exacerbated when a data sector is split into three data sector portions that are separated by two different servo sectors with different offsets for each data portion.

Accordingly, it would be desirable to provide a new method of reading data stored in a data storage device. It would also be desirable to provide a new data storage device that performs a data read retry operation.

BRIEF SUMMARY OF THE INVENTION

In one aspect of the inventive concept, a method of reading data is provided for a disk drive unit comprising at least one disk having a plurality tracks, wherein at least one track includes a data sector divided by at least a first servo sector so as to have at least a first data sector portion on a first side of the first servo sector, and at least a second data sector portion on a second side of the first servo sector, and a head for reading data from the data sectors. The method comprises: positioning the head at a first offset position with respect to a track; and reading data from the data sector with the head at the first offset position. The method further comprises, when a read error is detected between the first data sector portion and the second data sector portion: storing the data read from the first data sector portion in a memory; moving the head to a second offset position with respect to the track including the data sector being read; reading data from the second data sector portion with the head at the second offset position; and storing the data read from the second data sector portion in the memory.

In another aspect of the inventive concept, a disk drive unit, comprises: at least one disk having a plurality of data sectors and a head for reading data from the data sectors; a head for reading data from the disk; a memory for storing data read from the disk; and a disk drive controller for controlling operations of the disk drive unit. The disk drive controller is adapted to position the head at a first offset position with respect to a track including a data sector divided by at least a first servo sector so as to have at least a first data sector portion on a first side of the first servo sector, and at least a second data sector portion on a second side of the first servo sector. The head reads data from the data sector at the first offset position. When a read error is detected between the first data sector portion and the second data sector portion, the disk drive controller is further adapted: to store the data read from the first data sector portion in the memory; to move the head to a second offset position with respect to the track including the data sector being read, the head reading data from the second data sector portion with the head at the second offset position; and to store the data read from the second data sector portion in the memory.

BRIEF DESCRIPTION OF THE DRAWINGS

FIGS. 5A-C illustrate in greater detail the exemplary data read operation shown in FIG. 4.

DETAILED DESCRIPTION OF THE EMBODIMENTS

Figure 1:
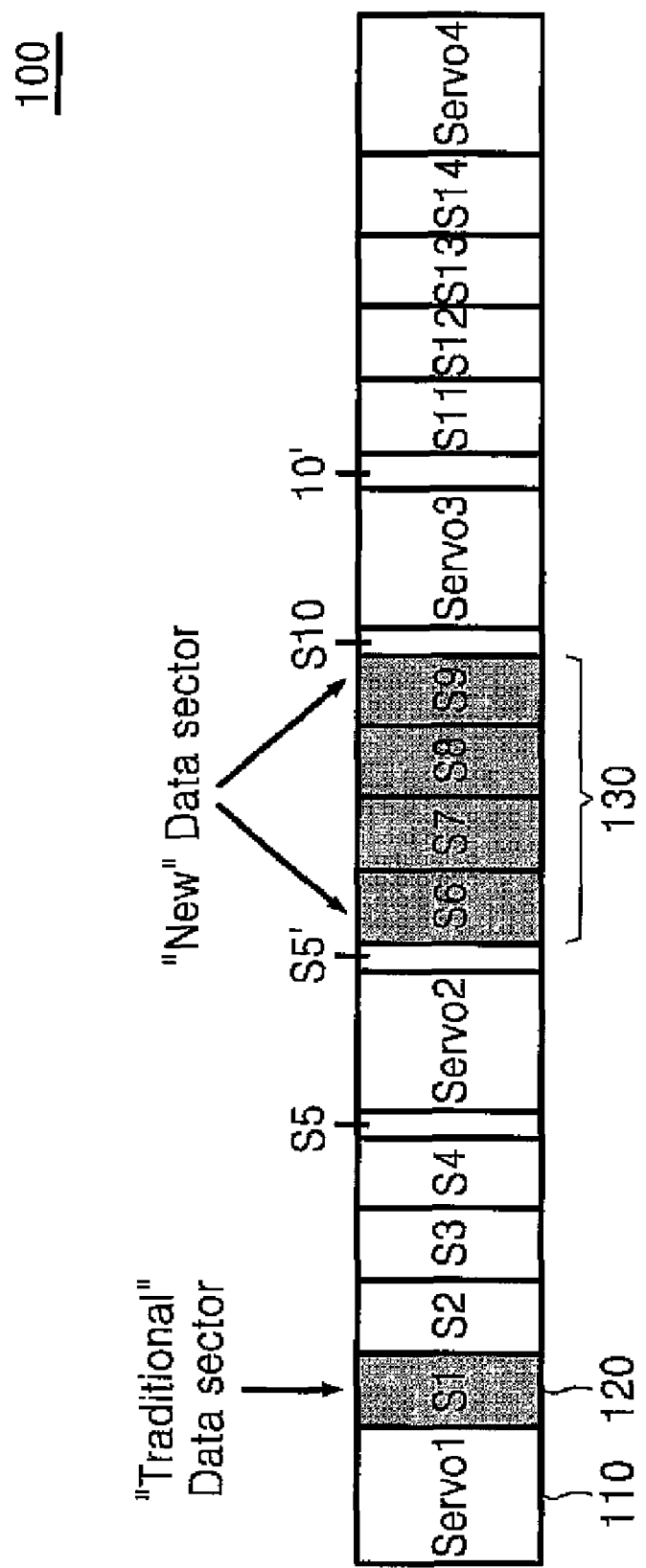
FIG. 1 illustrates a track structure of a data storage device.
Figure 2:
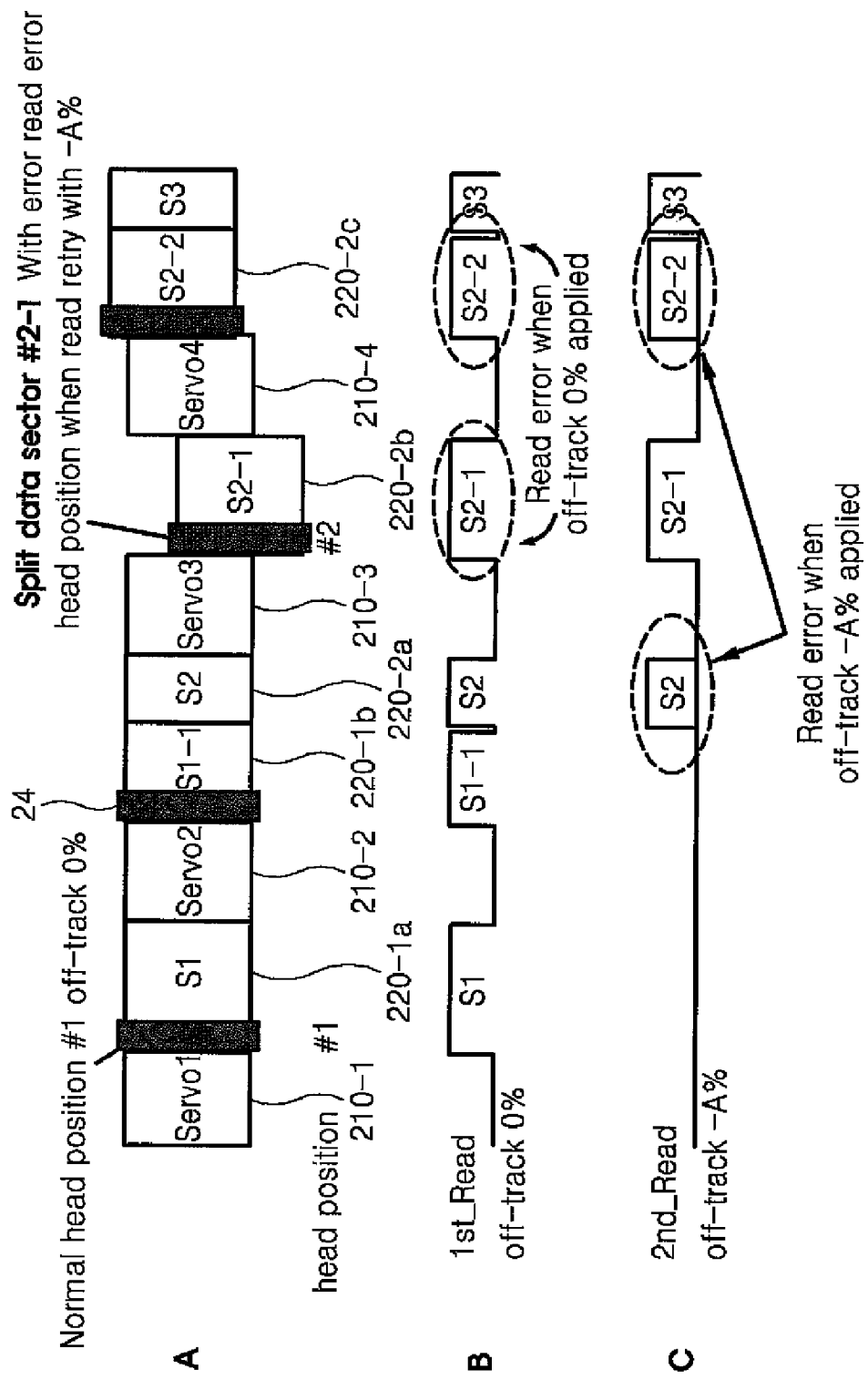
FIG. 2 illustrates an exemplary data read operation for a data storage device.
Figure 3:
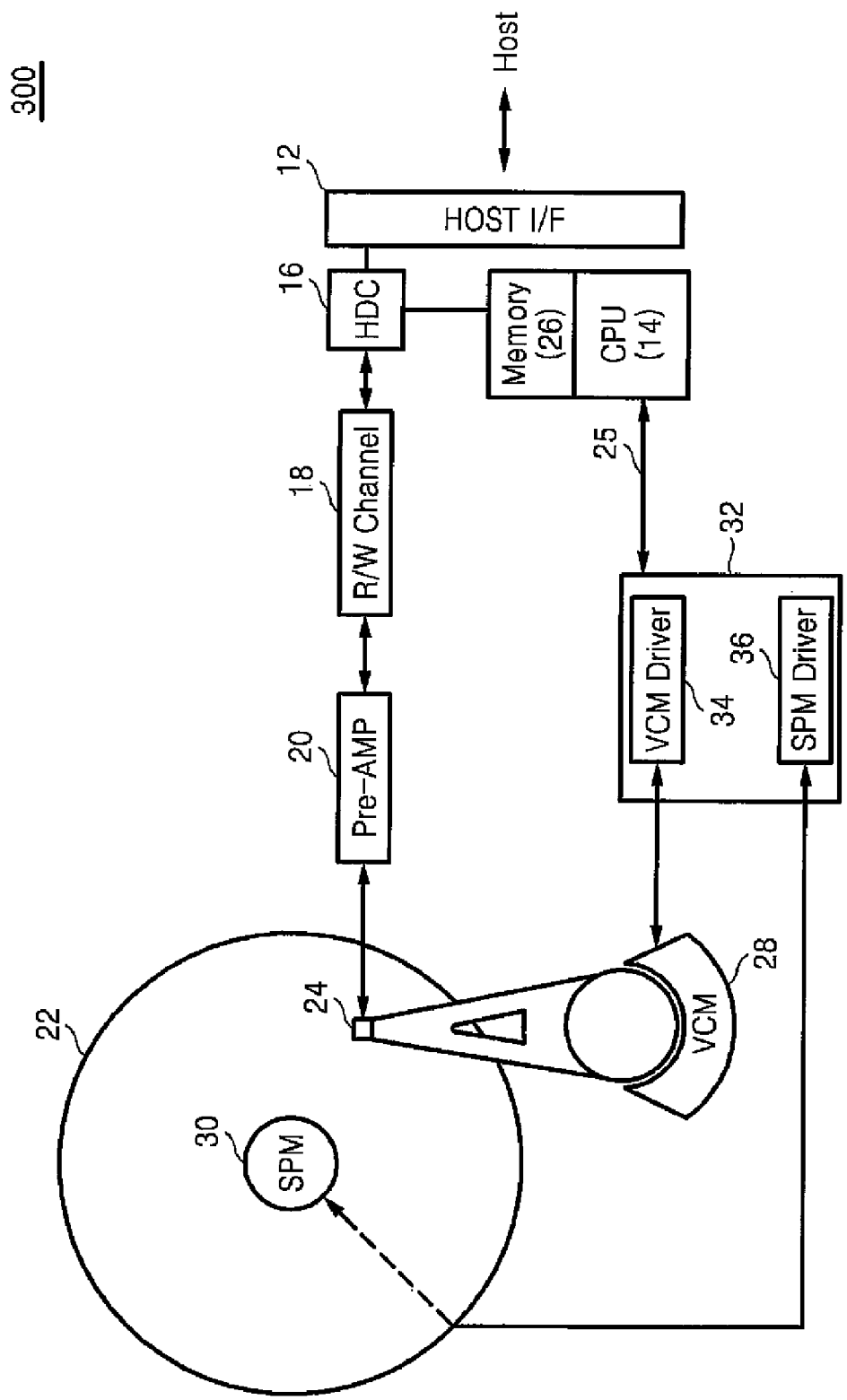
FIG. 3 illustrates a data storage device.

FIG. 3 illustrates one embodiment of a data storage device 300, and specifically a disk drive unit. Data storage device 300 includes a host interface 12, a processor 14, a hard disk controller (HDC) 16, a read/write channel 18, a pre-amplifier 20, one or more hard disks 22, a read head (or read/write head) 24, memory 26, a voice coil motor (VCM) 28, a spindle motor (SPM) 30, and a servo controller 32. Servo controller 32 includes a voice coil motor driver 34 and a spindle motor driver 36. Beneficially, hard disk(s) 22 employ a "multi-sector" or "large-sector" format, as explained above.

Figure 4:
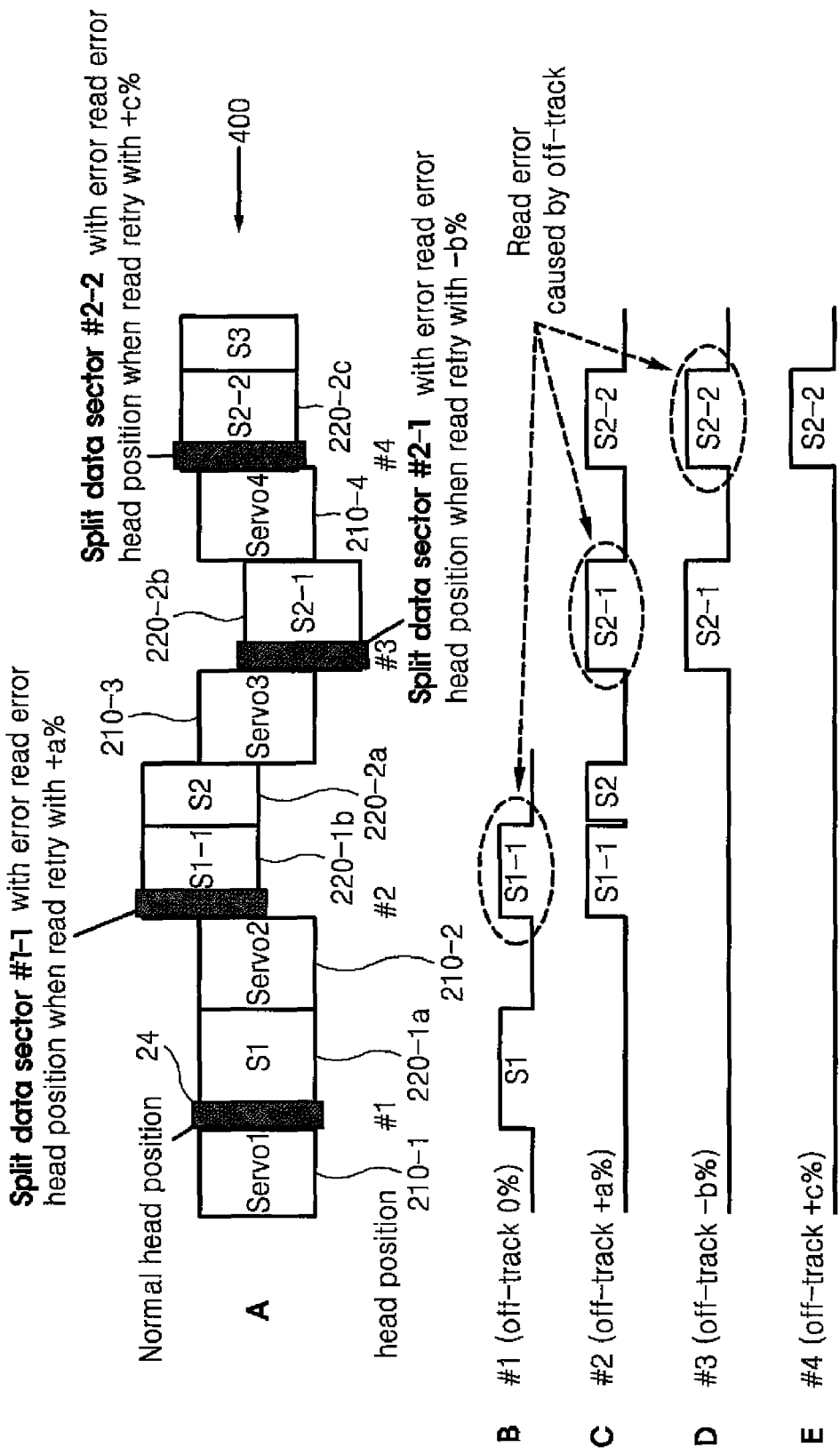
FIG. 4 illustrates an exemplary data read operation for a data storage device according to one embodiment described in this specification.

FIG. 4 illustrates an exemplary data read operation that may be performed by data storage device 300 according to one embodiment. As shown in FIG. 4, a first data sector 220-1 is divided by a servo sector Servo2 210-2 so as to have at least a first data sector portion S1 220-1*a* on a first side of servo sector Servo2 210-2, and a second data sector portion S1-1 220-1*b* on a second side of servo sector Servo2 210-2. Also, a second data sector 220-2 is divided by servo sectors Servo3 210-3 so as to have: a first data sector portion S2 220-2*a* on a first side of servo sector Servo3 210-3; a second data sector portion S2-1 220-2*b* on a second side of servo sector Servo3 210-3 and also on a first side of servo sector Servo4 210-4; and a third data sector portion S2-2 220-2*c* on a second side of servo sector Servo4 210-4.

During the read operation illustrated in FIG. 4 on line "A", a head 24 follows the track 400 at a "normal head position" having a 0% lateral offset with respect to the longitudinal direction of the track 400. Head 24 uses the servo information from the servo sectors 210 to follow the track 400.

As illustrated in FIG. 4 on line "B", with head 24 at the 0% offset, data is read correctly from the first data sector portion S1 220-1*a* of data sector 220-1. However, when head 24 tries to read the data of the second data sector portion S1-1 220-1*b*, it is unable to read the data correctly and there is a data read error. More specifically, when the head 24 tries to read the data from the second data sector portion S1-1 220-1*b* on the second side of servo sector Servo2 210-2 with head 24 at the 0% offset, second data sector portion S1-1 220-1*b* is too far offset from head 24 such that the data stored therein cannot be correctly recovered.

In that case, beneficially data storage device 300 stores into a buffer memory (e.g., memory 26) the correctly read data from the first data sector portion S1 220-1*a* of data sector 220-1, and then performs a "partial read retry" operation for reading the data of the second data sector portion S1-1 220-1*b*.

Accordingly, the lateral position of head 24 is adjusted to have a "+a %" lateral offset position with respect to the longitudinal direction of the track, and the head 24 retries reading the data of the second data sector portion S1-1 220-1*b*. Beneficially, head 24 does not attempt to re-read the data from the first data sector portion S1 220-1*a* that has already been correctly read and stored in the buffer memory.

With head 24 adjusted to have the +a % offset position, as illustrated in FIG. 4 on line "C" head 24 is able to correctly read the data from the second data sector portion S1-1 220-1*b* on the second side of servo sector Servo2 210-2. Data storage device 300 sends the recovered data from the second data sector portion S1-1 220-1*b* to the buffer memory where it is combined with the data previously written into the buffer memory from the first data sector portion S1 220-1*a* of data sector 220-1. Thus, by combining the correctly read data from the first data sector portion S1 220-1*a* of data sector 220-1 obtained with the head 24 at the 0% offset, with the correctly read data from the second data sector portion S1-1 220-1*b* obtained with the head 24 at the +a % offset, data storage device 300 can correctly read data sector 220-1.

As illustrated in FIG. 4 on line "C", after reading the data from the second data sector portion S1-1 220-1*b* with the head 24 at the +a % offset, the head 24 continues on to read data from the second data sector 220-2 at the same +a % offset.

Head 24 is able to correctly read the data from the first data sector portion S2 220-2a of second data sector 220-2, but is unable to read the data correctly from the second data sector portion S2-1 220-2b of second data sector 220-2 on the second side of servo sector Servo3 210-3 and there is another data read error. More specifically, when the head 24 tries to read the data from the second data sector portion S2-1 220-2b on the second side of servo sector Servo3 210-3 with head 24 at the +a % offset, second data sector portion S2-1 220-2b is too far offset from the current position of head 24 such that the data stored therein cannot be correctly recovered.

In that case, as before, beneficially data storage device 300 stores into a buffer memory (e.g., memory 26) the correctly read data from the first data sector portion S2 220-2a of data sector 220-2, and then performs a "partial read retry" operation for reading the rest of the data of the second data sector 220-2.

Accordingly, the lateral position of head 24 is adjusted to have a "−b %" lateral offset position with respect to the longitudinal direction of the track, and the head 24 retries reading the data of the second data sector portion S2-1 220-2b. Beneficially, head 24 does not again attempt to read the data from the first data sector portion S2 220-2a that has already been correctly read and stored in the buffer memory.

With head 24 adjusted to have the "−b %" offset position, as illustrated in FIG. 4 on line "D", head 24 is able to correctly read the data from the second data sector portion S2-1 220-2b on the second side of servo sector Servo3 210-3. Data storage device 300 sends the recovered data from the second data sector portion S2-1 220-2b to the buffer memory where it is combined with the data previously written into the buffer memory from the first data sector portion S2 220-2a of data sector 220-1. Then, head 24 attempts to read the remaining data for data sector 220-2 from the third data sector portion S2-2 220-2c on the second side of servo sector Servo4 210-4.

As illustrated in FIG. 4 on line "D", head 24 is unable to correctly read the data from the third data sector portion S2-2 220-2c of second data sector 220-2 on the second side of servo sector Servo4 210-4 and there is a data read error. More specifically, when the head 24 tries to read the data from the third data sector portion S2-2 220-2c on the second side of servo sector Servo4 210-4 with head 24 at the −b % offset, third data sector portion S2-2 220-2c is too far offset from the current position of head 24 such that the data stored therein cannot be correctly recovered.

In that case, as before, beneficially data storage device 300 performs a "partial read retry" operation for reading the rest of the data of the second data sector 220-2.

Accordingly, the lateral position of head 24 is adjusted to have a "+c %" lateral offset position with respect to the longitudinal direction of the track, and the head 24 retries reading the data of the third data sector portion S2-2 220-2c. Beneficially, head 24 does not again attempt to read the data from the first and second data sector portions S2 220-2a and S2-1 220-2b that have already been correctly read and stored in the buffer memory.

With head 24 adjusted to have the "+c %" offset position, as illustrated in FIG. 4 on line "E" head 24 is able to correctly read the data from the third data sector portion S2-2 220-2c on the second side of servo sector Servo4 210-4. Data storage device 300 sends the recovered data from the third data sector portion S2-2 220-2c to the buffer memory where it is combined with the data previously written into the buffer memory from the first and second data sector portions S2 220-2a and S2-1 220-2b of data sector 220-1.

Thus, by combining the correctly said data for the first data sector portion S2 220-2a obtained with the head 24 at the +a % offset, with the correctly read data for the second data sector portion S2-1 220-2b obtained with the head 24 at the −b % offset, and with the correctly read data for the third data sector portion S2-2 220-2c obtained with the head 24 at the +c % offset, data storage device 300 can correctly read data sector 220-2.

So it is seen that data storage device 300 can successfully recover data stored in "multi-sector" or "large-sector" data sectors which are divided by a servo sector and which have different "off-track" amounts or percentages for the data sector portions on different sides of the servo sector. Furthermore, data storage device 300 can successfully recover data stored from a data sector that is split into three data sector portions that are separated by two different servo sectors with different offsets for each data portion.

Figure 5B:
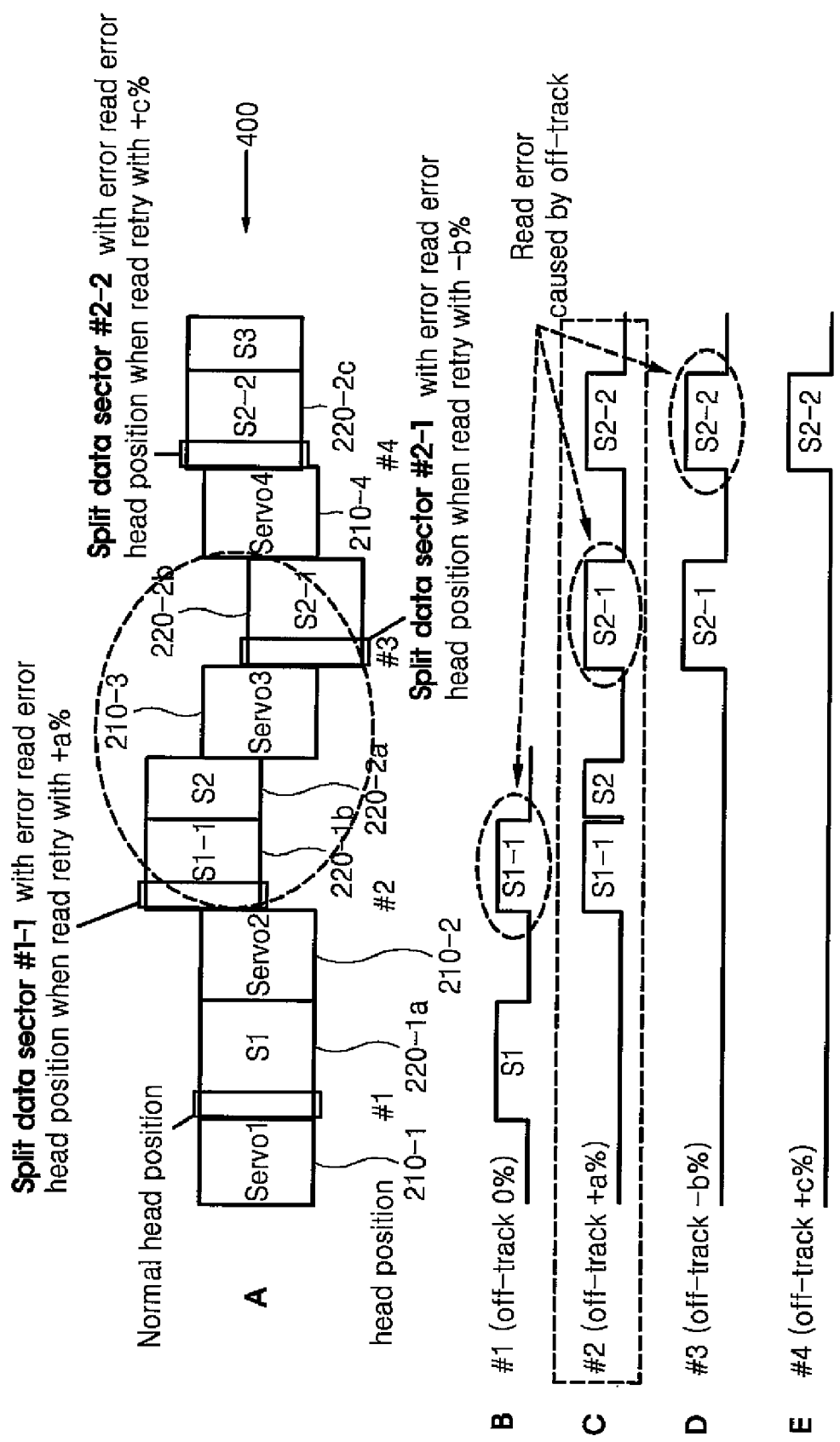
Figure 5C:
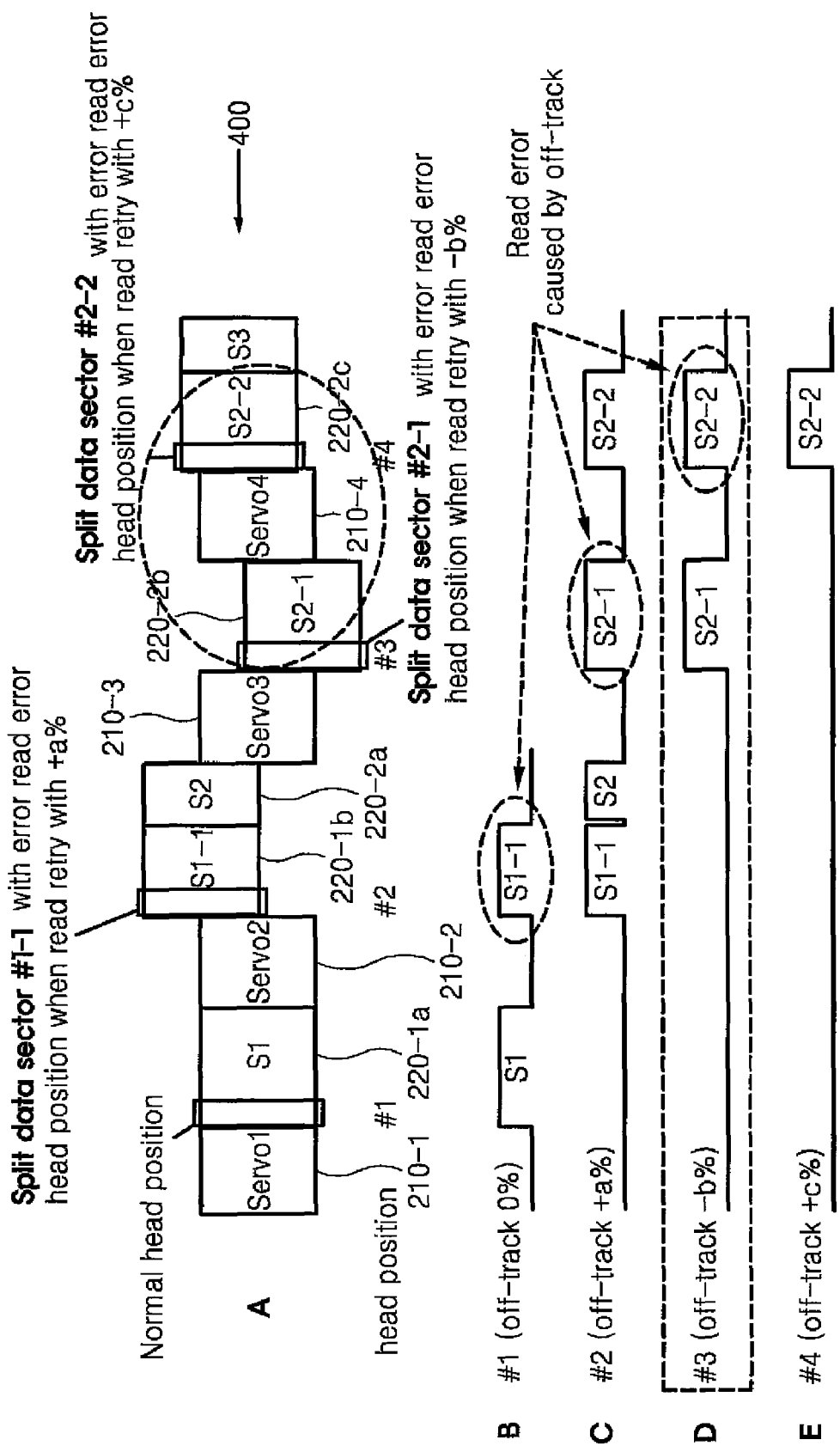

FIGS. 5A-C illustrate in greater detail the data read operation shown in FIG. 4 for explanation of the operation with respect to the data storage device of FIG. 3.

FIG. 5A illustrates the portion of the data read operation performed with head 24 positioned at a "normal" offset of 0%. In this portion of the operation, head 24 reads the data which was previously written and stored in the first data sector portion S1 220-1a of data sector 220-1 and sends the detected data signal to the pre-amplifier 20. HDC 16 receives the signal from the pre-amplifier 20 via Read/Write channel 18 and checks for a read error. When head 24 tries to read the data of the second data sector portion S1-1 220-1b, HDC 16 detects the data read error.

In that case, the correctly read data from first data sector portion S1 220-1a of data sector 220-1 is stored in a buffer memory (e.g., memory 26), and processor 14 and/or HDC 16 checks the data sector position for second data sector portion S1-1 220-1b using the servo sector information.

Processor 14 generates a position control signal 25 to control the position of head 24. In response to the position control signal, servo controller 32 controls head 24 to change the off-track value for head 24 from 0% to +a %.

FIG. 5B illustrates the portion of the data read operation performed with head 24 positioned at an off-track value of +a %. In this portion of the operation, head 24 retries to read the data which was previously written and stored in the second data sector portion S1-1 220-1b of data sector 220-1 and sends the detected data signal to the pre-amplifier 20. Beneficially, head 24 does not again attempt to read the data from the first data sector portion S1 220-1a that has already been correctly read and stored in the buffer memory, and begins reading from the second data sector portion S1-1 220-1b.

HDC 16 receives the signal from the pre-amplifier 20 via Read/Write channel 18 and checks for a read error. Head 24 correctly reads the data of the second data sector portion S1-1 220-1b of data sector 220-1, and sends this data to the buffer memory to be combined with the data previously stored in the buffer memory from the first data sector portion S1 220-1a.

Then, head 24 tries to read the data of the next data sector 220-2. Here, head 24 correctly reads the data from the first data sector portion S2 220-2a. However, when head 24 reads the data from the second data sector portion S2-1 220-2b of data sector 220-2, HDC 16 again detects a data read error.

In that case, the correctly read data from first data sector portion S2 220-2a of data sector 220-2 is stored in the buffer memory, and processor 14 and/or HDC 16 checks the data sector position for second data sector portion S2-1 220-2b using the servo sector information.

Processor 14 generates a position control signal 25 to control the position of head 24. In response to the position control signal, servo controller 32 controls head 24 to change the off-track value for head 24 from +a % to −b %.

FIG. 5C illustrates the portion of the data read operation performed with head 24 positioned at an off-track value of −b %. In this portion of the operation, head 24 retries to read the data which was previously written and stored in the second data sector portion S2-1 220-2b of data sector 220-2 and sends the detected data signal to the pre-amplifier 20. Beneficially, head 24 does not again attempt to read the data from the first data sector portion S2 220-2a that has already been correctly read and stored in the buffer memory, and begins reading from the second data sector portion S2-1 220-2b.

HDC 16 receives the signal from the pre-amplifier 20 via Read/Write channel 18 and checks for a read error. Head 24 correctly reads the data of the second data sector portion S2-1 220-2b of data sector 220-2, and sends this data to the buffer memory to be combined with the data previously stored in the buffer memory from the first data sector portion S2 220-2a.

Then, head 24 tries to read the data of the third data sector portion S2-2 220-2c of data sector 220-2, and HDC 16 again detects the data read error.

In that case, the correctly read data from second data sector portion S2-1 220-2b of data sector 220-2 is stored in the buffer memory, which already stores the data from first data sector portion S2 220-2a, and processor 14 and/or HDC 16 checks the data sector position for third data sector portion S2-2 220-2c using the servo sector information.

Figure 6:
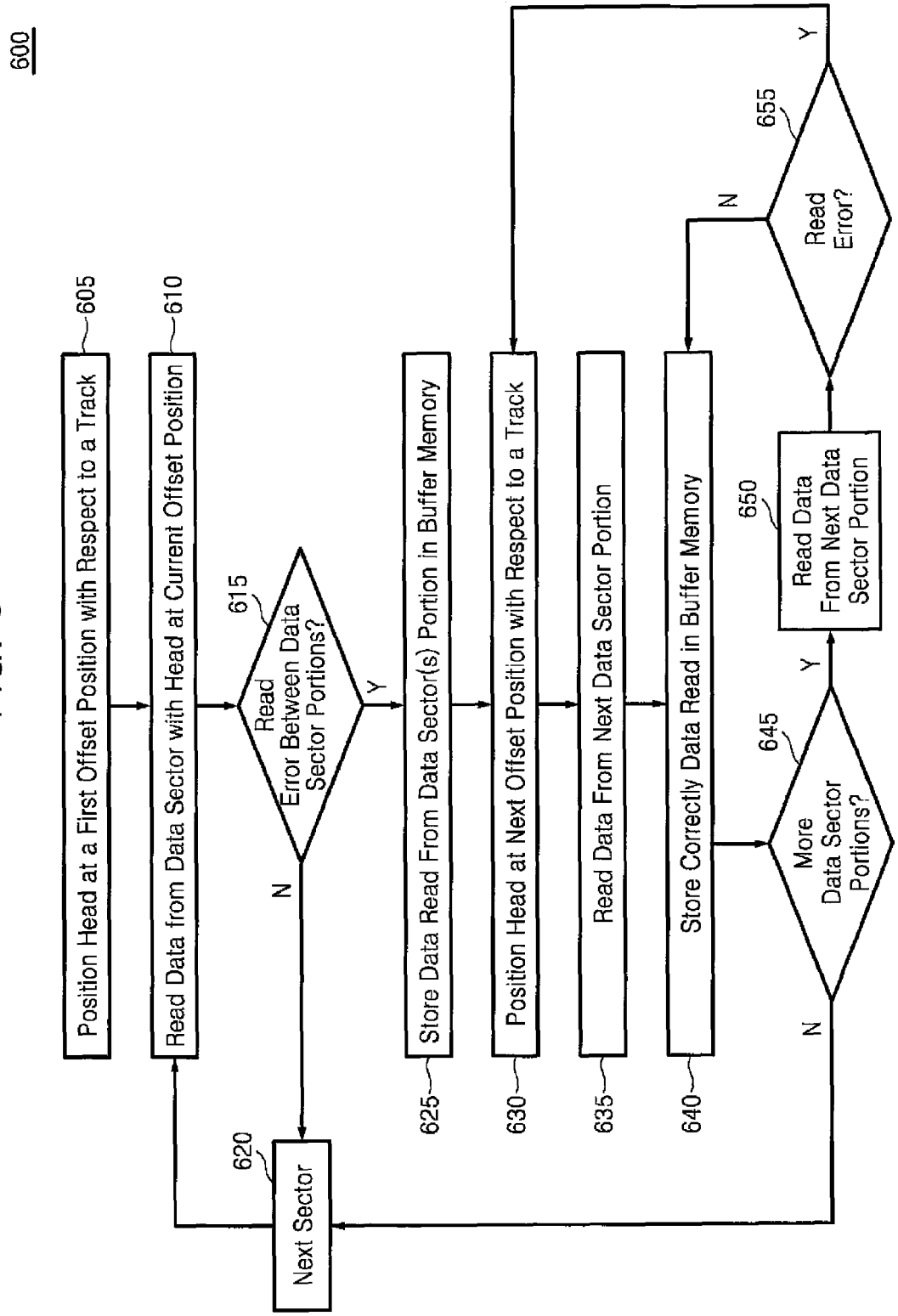
FIG. 6 is a flowchart illustrating one embodiment of method of reading data from a data storage device.

Processor 14 generates a position control signal 25 to control the position of head 24. In response to the position control signal, servo controller 32 controls head 24 to change the off-track value for head 24 from −b % to +c %, and the process continues FIG. 6 is a flowchart illustrating one embodiment of method of reading data from a data storage device.

In a step 605, a data storage device positions a read head (or read/write head) at a first offset position with respect to a track where data is to be read.

In a next step 610, the data storage device reads data from a data sector with the head at the current offset position.

In a step 615, the data storage device determines whether or not there has been a read error between data sector portions of the data sector. If no error is detected, then the process continues at step 620 reading a next data sector with the head positioned at the current offset position, beginning again at step 610.

However, if data storage device determines that there has been a read error between data sector portions of the data sector, then in a step 625 it stores the correctly read data from the first data sector portion in a memory.

Then, in a step 630 data storage device positions the read head (or read/write head) at a next offset position with respect to the track where data is to be read so as to be able to correctly read the data from the next data sector portion.

Next, in a next step 635, the data storage device reads data from the next data sector portion.

In a step 640, the data storage device stores the correctly read data from the next data sector portion in the memory.

In a step 645 it is determined whether there are any more data sector portions to be read for the current data sector. If not, then the process continues at step 620 reading a next data sector with the head positioned at the current offset position, beginning again at step 610.

However, if the data storage device determines that there are more data sector portions to be read for the current data sector, then in a step 650 the data storage device reads data from the next data sector portion.

In a step 655, the data storage device determines whether or not there has been a read error between data sector portions of the data sector. If no error is detected, then the process continues at step 640 where the data storage device stores the correctly read data in the memory.

However, if data storage device determines that there has been a read error between data sector portions of the data sector, then the process returns to step 630.

It should be noted that the order of many steps shown in FIG. 6 can be rearranged. For example, the order of steps 625 and 615 may be reversed where all correctly read data from a data sector is stored in the buffer memory even if there is no error in reading data from different data sector portions. Also, the orders of steps 625 and 630 can be reversed. Other rearrangements of the process are possible in keeping with the principles explained in detail above with respect to FIGS. 4 and 5A-C.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. In a disk drive unit comprising at least one disk having a plurality tracks, wherein the at least one track includes a data sector divided by at least a first servo sector so as to have at least a first data sector portion on a first side of the first servo sector, and at least a second data sector portion on a second side of the first servo sector, and a head for reading data from the data sector, a method comprising:
    positioning the head at a first offset position with respect to a track;
    reading data from the data sector with the head at the first offset position; and
    when a read error is detected between the first data sector portion and the second data sector portion:
        storing the data read from the first data sector portion in a memory,
        moving the head to a second offset position with respect to the track including the data sector being read,
        reading data from the second data sector portion with the head at the second offset position, and
        storing the data read from the second data sector portion in the memory.

2. The method of claim 1, wherein the second offset position is determined from detecting the first servo sector.

3. The method of claim 1, further comprising detecting the read error from an error correction code (ECC) field associated with the data sector being read.

4. The method of claim 1, wherein the data sector is divided by at least a second servo sector so as to have at least a third data sector portion, wherein the second data sector portion is located on a first side of the second servo sector and the third data sector portion is located on a second side of the second servo sector, the method further comprising:
    reading data from the third data sector portion with the head at the second offset position; and
    when a read error is detected between the second data sector portion and the third data sector portion:
        moving the head to a third offset position with respect to the track including the data sector being read,
        reading data from the third data sector portion with the head at the third offset position, and
        storing the data read from the third data sector portion in the memory.

5. The method of claim 4, wherein the second offset position is determined from detecting the second servo sector.

6. A disk drive unit, comprising:
at least one disk having a plurality of data sectors;
a head for reading data from the disk;
a memory for storing data read from the disk; and
a disk drive controller for controlling operations of the disk drive unit, the disk drive controller being adapted to position the head at a first offset position with respect to a track including a data sector divided by at least a first servo sector so as to have at least a first data sector portion on a first side of the first servo sector, and at least a second data sector portion on a second side of the first servo sector, the head reading data from the data sector at the first offset position, and when a read error is detected between the first data sector portion and the second data sector portion, the disk drive controller is further adapted:
to store the data read from the first data sector portion in the memory,
to move the head to a second offset position with respect to the track including the data sector being read, the head reading data from the second data sector portion with the head at the second offset position, and
to store the data read from the second data sector portion in the memory.

7. The disk drive unit of claim 6, wherein the second offset position is determined by the disk drive controller from detecting the first servo sector.

8. The disk drive unit of claim 6, wherein the disk drive controller detects the read error from an error correction code (ECC) field associated with the data sector being read.

9. The disk drive unit of claim 6, wherein when the data sector is divided by at least a second servo sector so as to have at least a third data sector portion, wherein the second data sector portion is located on a first side of the second servo sector and the third data sector portion is located on a second side of the second servo sector, then the disk drive controller is further adapted to read data from the third data sector portion with the head at the second offset position; and
when a read error is detected between the second data sector portion and the third data sector portion, the disk drive controller is further adapted:
to move the head to a third offset position with respect to the track including the data sector being read, the head reading data from the third data sector portion with the head at the third offset position, and
to store the data read from the third data sector portion in the memory.

10. The disk drive unit of claim 9, wherein the disk controller determines the second offset portion from detecting the second servo sector.

* * * * *